United States Patent [19] [11] 3,947,871
Amari et al. [45] Mar. 30, 1976

[54] COLOR VIDEO SIGNAL REPRODUCING APPARATUS

[75] Inventors: Shinji Amari, Houya; Kazuo Yamagiwa, Tokyo, both of Japan

[73] Assignee: Sony Corporation, Tokyo, Japan

[22] Filed: Nov. 5, 1974

[21] Appl. No.: 521,203

[30] Foreign Application Priority Data
Nov. 16, 1973 Japan.............................. 48-128885

[52] U.S. Cl..................................... 358/8; 358/26
[51] Int. Cl.².................... H04N 5/795; H04N 9/49
[58] Field of Search................................. 358/8, 26

[56] References Cited
UNITED STATES PATENTS
3,750,042  7/1973  Peil....................................... 358/26
3,755,618  8/1973  Poppy..................................... 358/26
3,852,808  12/1974  Sadashige............................... 358/8

Primary Examiner—Howard W. Britton
Attorney, Agent, or Firm—Lewis H. Eslinger; Alvin Sinderbrand

[57] ABSTRACT

In a color video signal reproducing apparatus having a plurality of magnetic heads, chrominance signals contained in color video signals respectively reproduced by the plurality of magnetic heads are separately subjected to level or gain control with a view to being equal in level, the levels of the respective chrominance signals are discriminated or detected and, when the level of any one or more of the chrominance signals is outside the control range of the above level or gain control, a so-called color killer operation is carried out.

8 Claims, 9 Drawing Figures

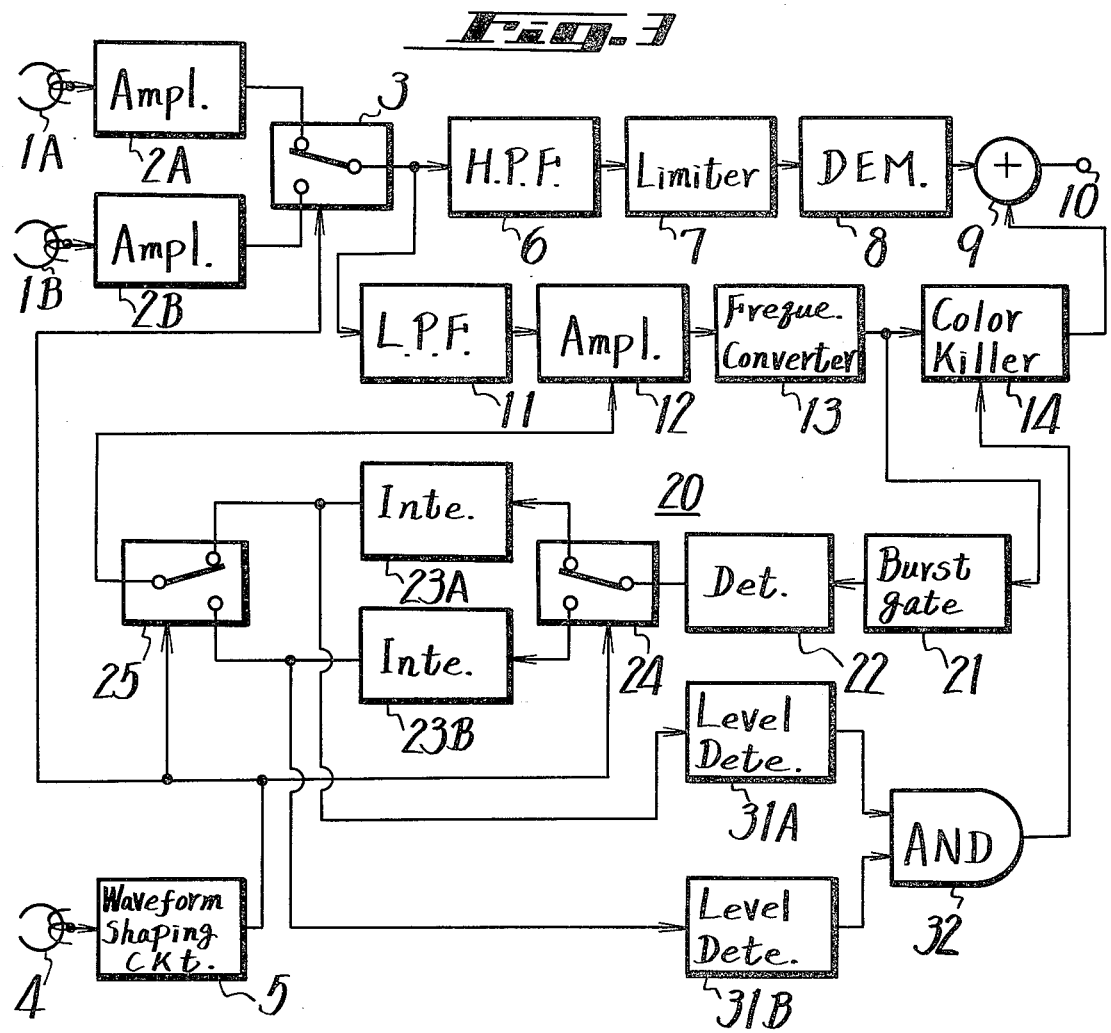
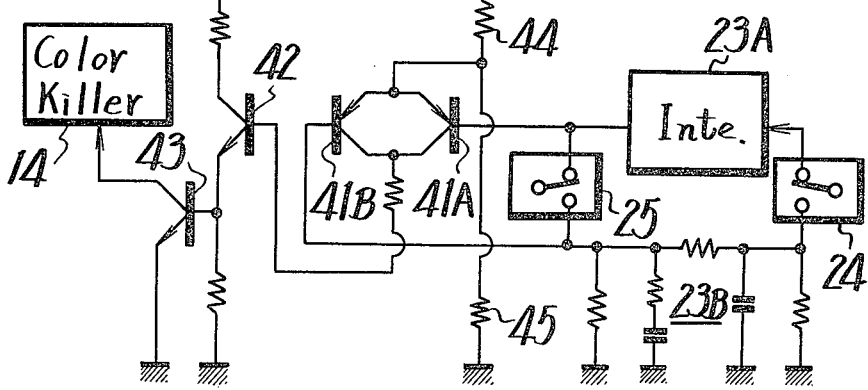

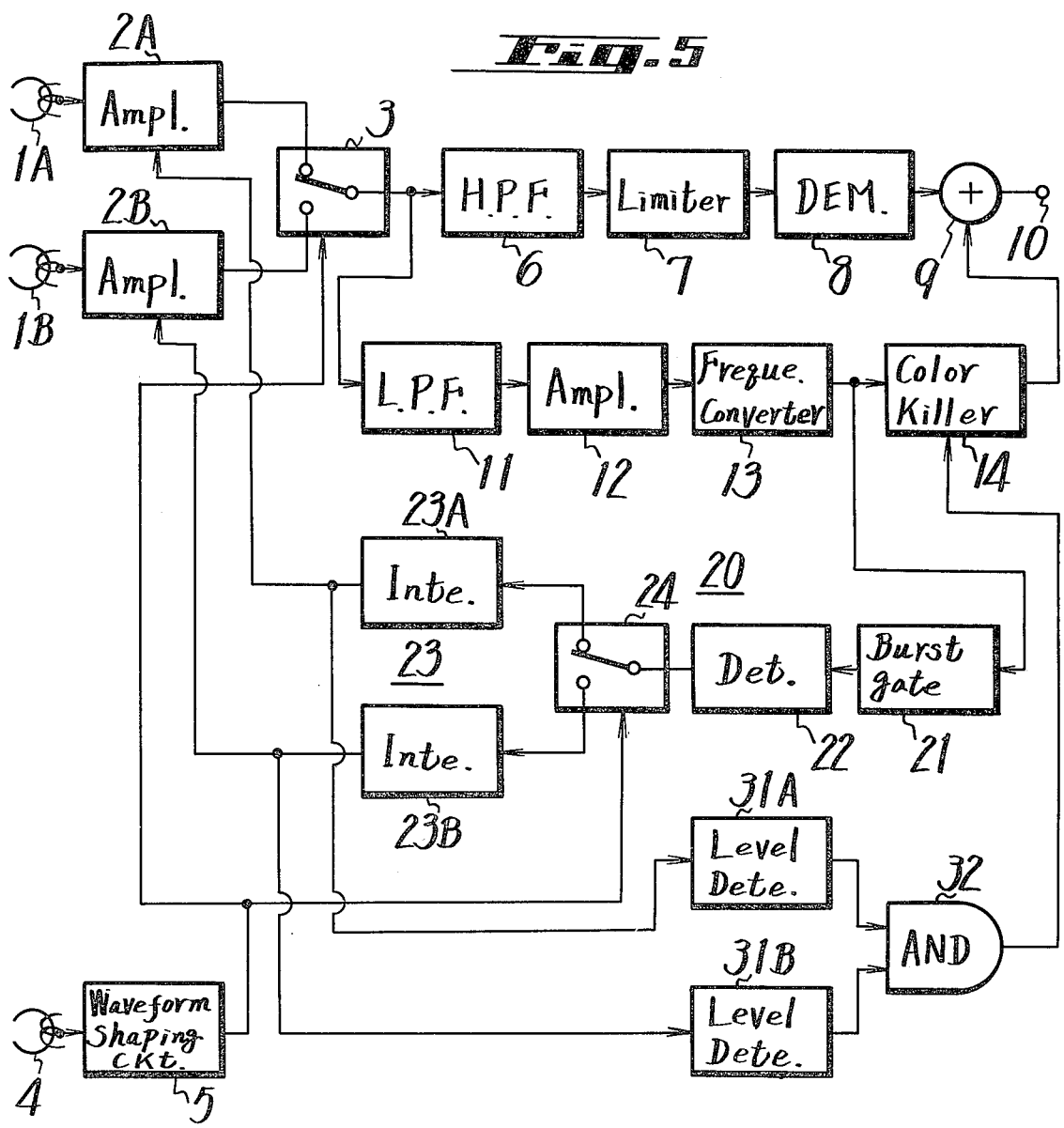

COLOR VIDEO SIGNAL REPRODUCING APPARATUS

BACKGROUND OF THE INVENTION

1. Field of the Invention

The present invention relates generally to a color video signal reproducing apparatus, and more particularly to a color video signal reproducing apparatus in which an automatic chroma (color) control (which will be hereinafter referred simply to as an ACC) operation is positively performed and also in which erroneous operation of a color killer caused by the ACC operation is avoided.

2. Description of the Prior Art

In the recording operation of a prior art VTR (color video signal magnetic recording and/or reproducing apparatus or video tape recorder), a luminance signal is converted into an FM signal which may occupy the higher portion of a band which is recordable, a chrominance signal is frequency-converted to occupy a portion of the recordable band at the lower side of the band of the FM luminance signal, and the frequency-converted chrominance signal and the FM luminance signal are combined to form a combined signal which is recorded.

The reproducing system of such prior art VTR is formed as shown in FIG. 1, in which reference numerals or symbols 1A and 1B indicate rotary magnetic heads which altermately reproduce mixed or combined signals from a magnetic tape (not shown) during successive fields and apply the reproduced signals through amplifiers 2A and 2B to a switching circuit 3. Simultaneously, a magnetic head 4 reproduces a control signal from the magnetic tape and applies the reproduced control signal to a servo circuit (not shown) which preforms a tracking servo operation for the magnetic heads 1A and 1B. The control signal from head 4 is also applied to a waveform shaping circuit 5 to produce pulses which are reversed for successive fields and which are supplied to the switching circuit 3 as a control signal for the latter. Thus, the switching circuit 3 is changed over at the commencement of every field and hence delivers therethrough the reproduced signals from the heads 1A and 1B alternately in successive fields. That is, the switching circuit 3 delivers therethrough the reproduced signals continuously.

The reproduced signals from the switching circuit 3 is supplied to a high pass filter 6 which passes therethrough the FM luminance signal and applies the same through a limiter 7 to a demodulator circuit 8 for obtaining the original luminance signal. The original luminance signal is then applied to a mixing circuit 9.

The reproduced signal from the switching circuit 3 is also applied to a low pass filter 11 which passes therethrough the frequency-converted chrominance signal. The chrominance signal from the low pass filter 11 is then applied through an amplifier 12 to a frequency converter 13 by which its carrier is frequency-converted back to the carrier frequency of the chrominance signal of the original frequency band. The converted chrominance signal from convertor 13 is applied through a color killer circuit 14 to the mixing circuit 9 which combines the converted chrominance signal with the luminance signal to produce the original color video signal at an output terminal 10 connected to the mixing circuit 9.

Thus, the color video signal is reproduced by the prior art apparatus. However, since there is generally a scattering in the reproducing sensitivity of the heads 1A and 1B and there is also a lack of uniformity in the contact pressure of the heads 1A and 1B with the tape, the level of the reproduced combined or mixed signal reproduced by the head 1A (refer to FIG. 2A) may be higher than that of the mixed signal reproduced by the head 1B (refer to FIG. 2B). For this reason, the mixed signals from the switching circuit 3 may be changed in level for the successive fields as shown in FIG. 2C. As a result, the level of the chrominance signal from the low pass filter 11 may change for successive fields and, accordingly, the level of the chrominance signal contained in the color video signal delivered to the output termonal 10 may also change for successive fields to produce color flicker in a reproduced color video signal.

In order to avoid such a defect, there is provided in the prior art VTR an ACC circuit 20 which consists of a burst gate circuit 21, a detector circuit 22 and an integrator circuit 23. More specifically, the chrominance signal from the frequency converter 13 is fed to the burst gate circuit 21 which separates or extracts a burst signal. The burst signal is then applied to the detector circuit 22 to be peak-detected and the detected signal is applied to the integrator circuit 23 to provide a DC voltage which corresponds to the peak value of the burst signal and is maintained for one field interval. The DC voltage is applied to the amplifier 12 as its gain control signal. The gain of the amplifier 12 is so controlled by the voltage from circuit 23 that the burst signal contained in the output of the amplifier becomes constant in level. Accordingly, when the burst signal in the chrominance signal from the amplifier 12 is controlled to be constant in level, the chrominance signal is also constant in level. As a result, it would be expected that the level of the chrominance signal in the color video signal delivered to the output terminal 10 is kept constant and hence no flicker would appear in the reproduced picture.

In the prior art VTR, however, since the ACC circuit 20 must correct the level difference between the chrominance signals for successive fields, its response speed is required to be high. However, the burst signal is at most produced at the field frequency and there is a limit on the S/N ratio, so that if the integrator circuit 23 is provided with a short time constant to give the ACC circuit 20 a rapid response, a transient level variation is produced at the initial portion of the chominance signal of each field as shown in FIG. 2D, and such transient level variation appears as color flicker in the reproduced picture. This is uncomfortable for a viewer.

SUMMARY OF THE INVENTION

Accordingly, it is an object of the present invention to provide a color video signal reproducing apparatus free from the above described defects inherent in the prior art.

It is another object of the present invention to provide a color video signal reproducing apparatus which positively performs the ACC operation.

It is further object of the present invention to provide a color video signal reproducing apparatus which avoids erroneous operation of a color killer that may result from the ACC operation.

In accordance with an aspect of this invention, a color video signal reproducing apparatus having a plurality of rotary heads operative in a cyclically repeated order to successively reproduce recorded color video signals containing luminance and chrominance components or signals and a circuit for transmitting the successively reproduced signals from the rotary heads to an output terminal; is provided, in such circuit, with variable gain means operative on at least the chrominance component of the reproduced signals, and with color killer means operative to eliminate the chrominance component from the reproduced signals received at the output terminal; and the apparatus further comprises gain control means having a plurality of gain control elements respectively corresponding to the plurality of rotary heads and each being operative to apply a respective gain control signal to the variable gain means during reproducing of the recorded signals by the respective rotary head, and color killer control means for effecting operation of the color killer means when the level of the reproduced signals from any one or more of the rotaty heads is below a predetermined level at which the variable gain means is effective to equalize the level of the reproduced signals transmitted to the output terminal from the plurality of heads.

The above, and other objects, features and advantages of the present invention, will become apparent from the following description taken in conjunction with the accompanying drawings.

BRIEF DESCRIPTION OF THE DRAWINGS

FIG. 3 is a schematic circuit diagram showing an embodiment of a color video signal reproducing apparatus according to the present invention;

FIG. 4 is a detailed connection diagram of a portion of the apparatus shown in FIG. 3; and FIG. 5 is a schematic circuit diagram showing another embodiment of the present invention.

DESCRIPTION OF THE PREFERRED EMBODIMENTS

Figure 1:
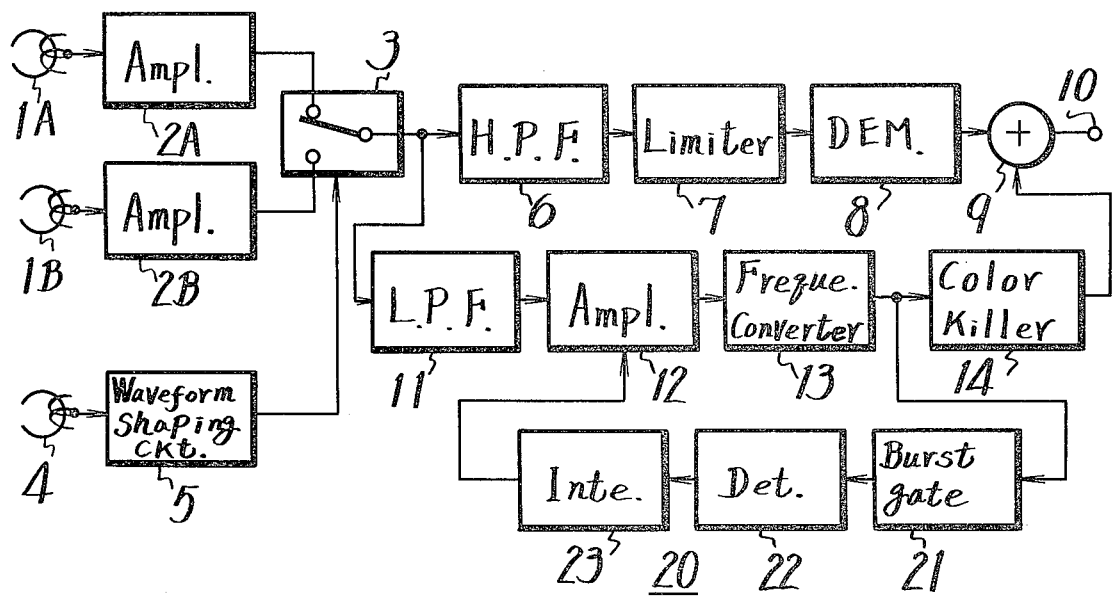
FIG. 1 is a schematic circuit diagram showing a prior art color video signal reproducing apparatus.

An embodiment of a color video signal reproducing apparatus according to the present invention will now be described with reference to FIG. 3 in which components corresponding to those included in the prior art apparatus of FIG. 1 are identified by the same reference numerals and hence their detailed description will be omitted.

Generally, in the embodiment of the present invention shown in FIG. 3, two integrator circuits 23A and 23B are provided in the ACC circuit 20. During the field time period within which reproduction is carried out by the head 1A, the integrator circuit 23A is used to achieve the ACC operation, and, during the field time period within which reproduction is carried out by the head 1B, the integrator circuit 23B is used to achieve the ACC operation. Output signals from the integrator circuits 23A and 23B, respectively, are subjected to level detection, and when the level of one or both of such output signals is lower than the operating level of the ACC circuit 20, the color killer operation is carried out.

More specifically, in the embodiment of the present invention shown in FIG. 3, the detected output signal from the detector circuit 22 is applied to a switching circuit 24 which is controlled by the head switching pulses, which are reversed for successive fields, from the waveform shaping circuit 5. Thus, during the field time interval within which reproduction is carried out by the head 1A, the detected signal from the detector 22 is applied to the integrator circuit 23A, whereas, during the field time interval within which reproduction is carried out by the head 1B, the detected signal from the detector circuit 22 is applied to the integrator circuit 23B. Thus, each of the integrator circuits 23A and 23B provides a DC voltage signal which holds or retains a level, substantially during at least one field period, corresponding to the peak value of the burst signal detected by the detector 22 during the respective field period.

The DC voltages from the integrator circuits 23A and 23B are supplied to a switching circuit 25 which is also controlled by the head switching pulse from the waveform shaping circuit 5. As a result, the switching circuit 25 delivers therethrough the DC voltage from the integrator circuit 23A during the field interval when the reproduction is carried out by the head 1A, whereas, the DC voltage from the integrator circuit 23B is delivered through switching circuit 25 during the field interval when the reproduction is carried out by the head 1B. The DC voltages alternately derived from the switching circuit 25 are fed to the amplifier 12 as its gain control signal.

Figure 2A:
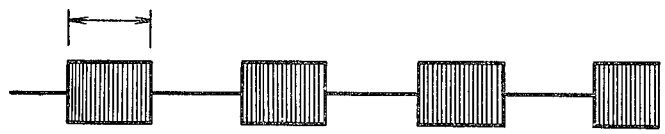
FIGS. 2A, 2B, 2C and 2D are waveform diagrams to which reference is made in explaining the prior art apparatus shown in FIG. 1.
Figure 2B:
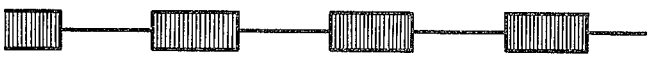
Figure 2C:
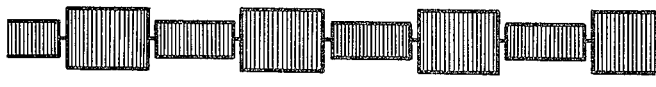
Figure 2D:

Accordingly, the embodiment of the present invention shown in FIG. 3 achieves the ACC operation substantially in the same manner as apparatus shown in FIG. 1. However, in the case of the apparatus of FIG. 3, due to the fact that the levels of the reproduced signals from the heads 1A and 1B are changed at the field frequency as shown in FIG. 2C, even if the level of the detected signals from the detector circuit 22 is similarly changed with the field frequency, the integrator circuit 23A is supplied with only the detected signal corresponding to the signal reproduced by head 1A which level is not changed rapidly. Similarly, the integrator circuit 23B is supplied with only the detected signal corresponding to the signal reproduced by head 1B which detected signal is not changed rapidly. As a result, there is no need to provide the integrator circuits 23A and 23B with short time constants so as to give them rapid responses. Therefore, there is no danger that the level of the chrominance signal from the amplifier 12 will have transient variations, as shown in FIG. 2D, and hence there is avoidance of color flicker, and particularly of color flicker all over the reproduced picture.

However, the possibiity that the color killer circuit may operate erroneously is not avoided by the above described portion of the circuit according to this invention. In other words, when the heads 1A and 1B have very low reproduction levels, the ACC circuit 20 can not sufficiently correct the level of the chrominance signal. Therefore, in the event that there is a sensitivity difference of large degree between the heads 1A and 1B, for example, the head 1A has a very high reproduction level while the head 1B has very low reproduction level, even if the ACC circuit 20 operates to correct the level of the chrominance signal from the head 1A, the ACC circuit 20 may not operate for the chrominance signal from the head 1B and hence no level correction is carried out for the chrominance signal from the head 1B. As a result, during the field interval when reproduction is carried out by the head 1B, the color killer circuit 14 operates and, therefore, the color video signal and a black and white video signal appear at the output terminal 10 during alternate fields.

In order to avoid this defect, in the embodiment of the invention shown in FIG. 3, the output signals from the integrator circuits 23A and 23B are subjected to level detection, and when the level of any one or both such output signals becomes lower than the operating level (lock level) of the ACC circuit 20, the color killer operation is realized. More specifically, in the embodiment of FIG. 3, the DC voltage from the integrator circuits 23A and 23B are respectively applied to level discriminator or detector circuits 31A and 31B which detect whether the respective DC voltages are higher than the operating level of the ACC circuit 20 or not. When both DC voltages are higher than the operating level of the ACC circuit 20, an AND-curcuit 32 is supplied with signals of "1" from the level detectors 31A and 31B respectively. The output signal from the AND-circuit 32 is applied to the color killer circuit 14, so that when the output signal of the AND-circuit 32 is 1, the color killer circuit 14 stops its operation. As a result, at this time only the color video signal is delivered to the output terminal 10. In this case, the time constants of the integrator circuits 23A and 23B are selected so that each of the integrator circuits will hold the peak value of the detected signal from the detector circuit 22 for at least two field intervals.

With the circuit construction described above, in the event that the head 1B, by way of example, is very low in reproduction level and hence the level of the chrominance signal from the head 1B does not reach the correction level of the ACC circuit 20, since the DC level of the signal from the integrator circuit 23B is low, the detected level of the level detector 31B becomes "0". Accordingly, even if the head 1A has a high reproduction level and the level of the chrominance signal from the head 1A is higher than the operating level of the ACC circuit 20, the output of the AND-circuit 32 becomes 0. Thus, the color killer circuit 14 achieves its color killer operation. As a result, only the black and white video signal is delivered to the output terminal 10, that is, the color video signal and the black and white video signal are not alternately obtained at the output terminal 10. Further, in the event that the levels of the signals from the heads 1A and 1B are both lower than the operating level of the ACC circuit 20, the output of the AND-circuit 32 again becomes 0, so that the color killer circuit 14 performs its color killer operation.

As described above, the present invention carries out the ACC operation positively, reproduces a fine color picture with no color flicker and prevents the color killer circuit 14 from being operated erroneously.

Referring now to FIG. 4, it will be seen that, in a pratical embodiment of the circuit arrangement of FIG. 3, the detector circuits 31A, 31B and the AND-circuit 32 may be all constituted by transistors 41A and 41B. When the level of the chrominance signal sufficiently high to be within the operating level of the ACC circuit 20, the DC voltages from the integrator circuits 23A and 23B, respectively, are sufficient to turn OFF the transistors 41A and 41B, and hence transistors 42 and 43 are both made OFF with the result that no color killer operation is carried out.

However, when the level of the chrominance signal from the head 1B is low and does not reach the operating level of the ACC circuit 20, the DC voltage from the integrator circuit 23B also has a low level. Therefore, the transistor 41B is turned ON and hence transistors 42 and 43 are both turned ON to make the color killer circuit 14 perform its color killer operation. When the levels of the chrominance signals from both the heads 1A, that is, 1B are low and lower than the operating level of the ACC circuit 20, the DC voltages from the integrator circuits 23A and 23B are both small. Accordingly, the transistors 42 and 43 are both turned ON and hence the color killer circuit 14 again operates to perform its color killer operation. It will be apparent that the operating level of the color killer circuit 14 can be adjusted by changing the emitter voltage of the transistors 41A and 41B by suitably selecting or adjusting the resistance values of resistors 44 and 45.

FIG. 5 shows a further embodiment of the present invention in which the elements corresponding to those described above with reference to FIGS. 1 and 3 are identified by the same reference numerals and symbols. In the embodiment of FIG. 5, AGC or ACC circuits are provided for the amplifiers 2A and 2B, respectively. That is, the outputs from the integrator circuits 23A and 23B are directly supplied to the amplifiers 2A and 2B, respectively, to control the level of the chrominance signals which are included in the respective reproduced combined signals. This embodiment is otherwise similar to, and can achieve the same effect as the embodiment of FIG. 3.

It will be apparent that many variations and modifications can be effected by one skilled in the art in the above described specific embodiments of the invention without departing from the spirit or scope of the novel concepts of the present invention.

We claim as our invention:

1. A color video signal reproducing apparatus comprising
   a plurality of rotary heads operative in a cyclically repeated order to successively reproduce recorded color video signals containing luminance and chrominance components;
   an output terminal;
   circuit means for transmitting the successively reproduced signals from said rotary heads to said output terminal and including variable gain means operative on at least said chrominance component of the reproduced signals, and color killer means operative to eliminate said chrominance component from the reproduced signals as received at said output terminal
   gain control means including a plurality of control signal elements respectively corresponding to said plurality of rotary heads and each being operative to apply a respective gain control signal to said variable gain means during reproducing of the recorded color video signals by the respective one of said rotary heads; and
   color killer control means for effecting continuous operation of said color killer means so long as the level of the reproduced signals from any of said rotary heads is below a predetermined level.

2. A color video signal reproducing apparatus according to claim 1; in which said gain control means further includes means for detecting a peak level of the signals successively reproduced by said rotary heads, and means for applying the detected peak level selectively to said plurality of control signal elements in synchronism with the operation of the respective rotary heads; and in which each of said control signal elements is operative to establish the respective gain control signal in correspondence to said detected peak level applied thereto during the reproducing of signals by said respective one of the rotary heads, and to hold said respective gain control signal in correspondence substantially to said detected peak level during the reproducing of signals by the other of said rotary heads.

3. A color video signal reproducing apparatus according to claim 2; in which said gain control means further includes a burst gate for separating burst signals from said chrominance component of the reproduced signals after operation thereon of said variable gain means, said means for detecting a peak level of the successively reproduced signals detects the peak level of the separated burst signals, and switching means is operated synchronously with said rotary heads to selectively apply the detected peak level of the burst signals to said control signal elements; and in which each of said control signal elements is constituted by a respective integrating circuit.

4. A color video signal reproducing apparatus according to claim 1; in which said color killer control means includes a plurality of level detectors respectively corresponding to said plurality of rotary heads and each being operative to detect a signal corresponding to the level of the reproduced signals from the respective one of said rotary heads, and a signal processing circuit connected to said plurality of level detectors for providing a color killer signal effecting operation for said color killer means whenever any of said plurality of level detectors detects a signal level which corresponds to reproduced signals below said predetermined level.

5. A color video signal reproducing apparatus according to claim 1; in which said signal processing circuit is constituted by an AND gate to halt operation of said color killer means only when all of said plurality of level detectors detect signal levels corresponding to reproduced signals above said predetermined level.

6. A color video signal reproducing apparatus according to claim 4; in which said gain control means further includes means for detecting a peak level of the signals successively reproduced by said rotary heads, and means for applying the detected peak level selectively to said plurality of control signal elements in synchronism with the operation of the respective rotary heads; and in which each of said control signal elements is operative to establish the respective gain control signal in correspondence to said detected peak level applied thereto during the reproducing of signals by said respective one of the rotary heads, and to hold said respective gain control signal in correspondence substantially to said detected peak level during the reproducing of signals by the other of said rotary heads.

7. A color video signal reproducing apparatus according to claim 6; in which each of said plurality of level detectors of said color killer control means is connected with a respective one of said control signal elements of the gain control means for detecting the respective gain control signal.

8. A color video signal reproducing apparatus according to claim 7; in which said gain control means further includes a burst gate for separating burst signals from said chrominance component of the reproduced signals after operation thereon of said variable gain means, said means for detecting a peak level of the successively reproduced signals detects the peak level of the separated burst signals, and switching means is operated synchronously with said rotary heads to selectively apply the detected peak level of the burst signals to said control signal elements; and in which each of said control signal elements is constituted by a respective integrating circuit.

* * * * *